Oct. 7, 1930.    C. L. RAYFIELD    1,777,533
FLOAT OPERATED VALVE
Original Filed April 28, 1928
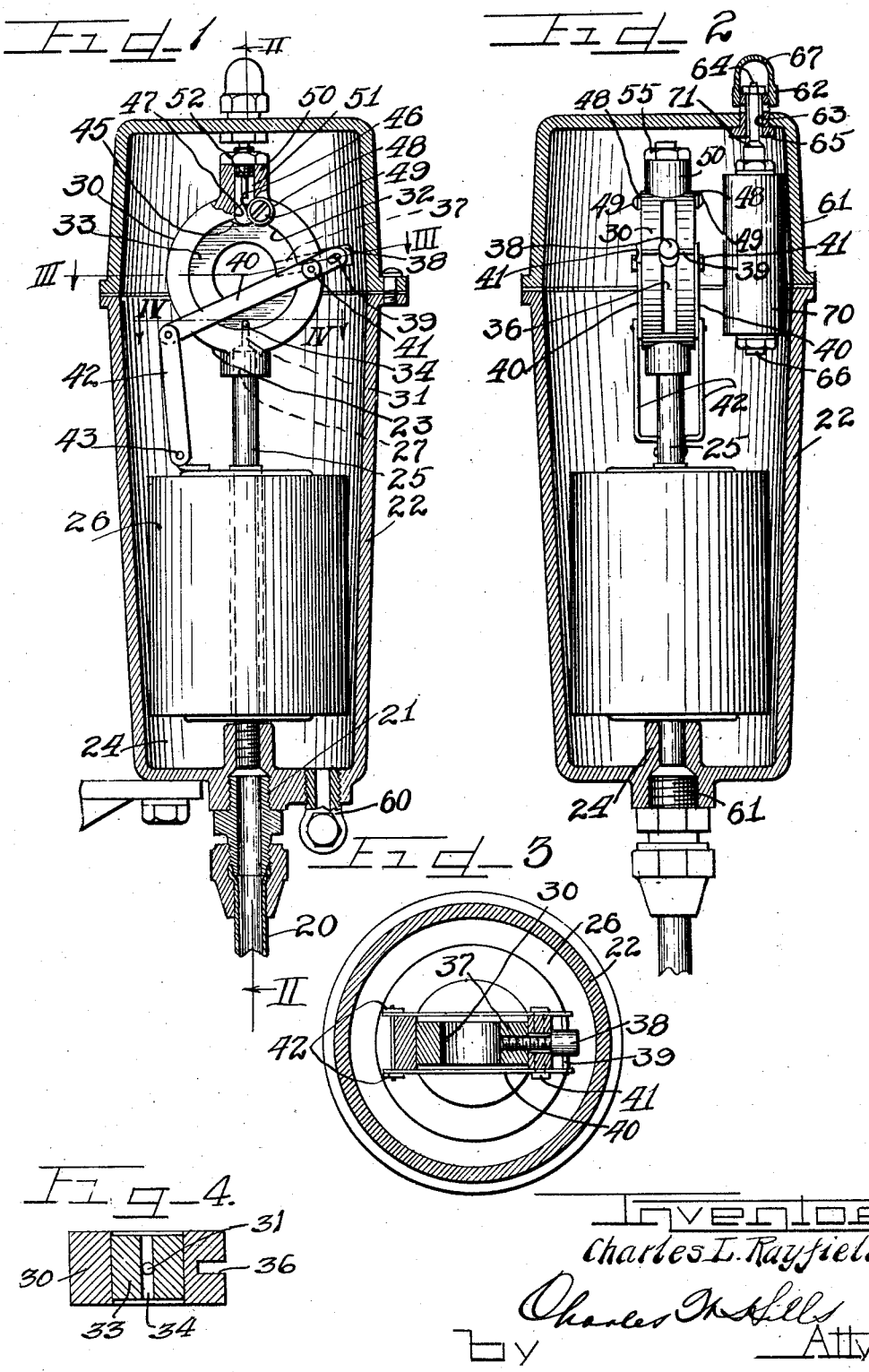

Patented Oct. 7, 1930

1,777,533

UNITED STATES PATENT OFFICE

CHARLES L. RAYFIELD, OF CHICAGO, ILLINOIS, ASSIGNOR TO RAYFIELD MANUFACTURING CO., OF CHICAGO, ILLINOIS, A CORPORATION OF ILLINOIS

FLOAT-OPERATED VALVE

Original application filed April 28, 1928, Serial No. 273,497. Divided and this application filed November 15, 1928. Serial No. 319,530.

This invention relates to valve construction and more particularly to a float controlled valve especially adapted for use in connection with oil burner systems and the like.

An object of the invention resides in the provision of a valve of the same general construction as the one disclosed in my copending patent application, Serial No. 243,359, filed December 29th, 1927, wherein the parts are much more compactly arranged than they are in the structure of my copending application.

Another object of the invention is to provide a float controlled valve automatically closable through the means of a wedging action when the fluid acting upon the float of the valve has risen to a predetermined level.

The present subject matter is divisional of my copending patent application, Serial No. 273,497, filed April 28th, 1928.

Other objects and advantages of the present invention will more fully appear from the following detailed description taken in connection with the accompanying drawing, which illustrates a single embodiment thereof and to which:

Figure 1 is a vertical sectional view, taken through the auxiliary tank and drawn to an enlarged scale, illustrating the float controlled valve mechanism therein for maintaining a predetermined level of liquid in the tank.

Figure 2 is a sectional view taken on the line II—II of Figure 1 and illustrating in detail the float controlled vent.

Figure 3 is a cross-sectional view taken on the line III—III of Figure 1 looking downwardly.

Figure 4 is a sectional view taken on the line IV—IV of Figure 1.

On the drawings:

The reference character 21 designates the inlet of a tank 22 which inlet is connected to a liquid supply line 20. The inlet 21 to the tank 22 is partially defined by a boss 24 which has threaded into it the lower end of a pipe 25. This pipe 25 extends upwardly through a bore in the center of a cylindrical float 26 slidably mounted upon the pipe 25. The upper end of the pipe 25 is threaded into an opening 27 in valve body 30. The bore of the pipe 25 communicates with an inlet 31 formed in the valve body. This inlet 31 terminates at its upper end in the circular recess 32 formed in the valve body. Positioned in the circular recess 32 is a rotary valve or ring member 33 which has formed in a portion of its periphery at the lower end a transverse slot 34 opening to the exterior and adapted to be aligned with the inlet opening 31 in the valve body 30.

The valve body 30 has formed in one of its sides (Figure 2) a vertical recess 36 through which extends a rod 37 having its inner end threaded into the rotary valve member 33 and having its other and outer end provided with a bifurcated member 38 through which extends a pin 39 pivotally mounted at its ends in the adjacent ends of a pair of spaced levers 40, one being disposed on each side of the valve body 30. Each of the levers is pivotally connected between the ends by a stud 41 to the side of the valve body 30. The other ends of the levers 40 are pivotally connected to spaced vertical bars 42 hingedly secured at their lower ends to the float 26, as indicated at 43. The bars 42 and adjacent arms of the lever 40, which comprise a portion of the mechanism for moving the valve member, constitute a toggle.

The upper end of the rotary valve member 33 is cut away, as indicated at 45, in order to form an arcuate depression in the periphery of the rotary valve member 33. This depression 45, as shown in Figure 1, extends across the top of the valve member. Positioned on the curved surface defining the arcuate depression 45 is a cylindrical transverse wedging pin 46. The valve body 30 has formed in it a transverse slot 47 disposed above the depression 45 in the valve member 33 and adapted to receive and accommodate pin 46. The pin is held within the body 30 by means of washers 48 secured to the sides of the valve body 30 by bolts 49. The washers 48 are adapted to prevent the pin 46 from being displaced from the slot 47.

Formed integral with the upper end of the valve body 30 is a boss 50 having a substantially central opening 51 (Figure 1.) Threaded into the opening 51 is an adjustable pin 52, the lower end of which is adapted to project into the vicinity of the slot 47. Threaded onto the upper end of this adjustable pin 52 is a locknut 55 adapted to engage the top of the boss 50. It will be evident that by varying the position of the pin 52 it is possible to limit the upward travel of the pin 46 in slot 47.

In Figure 1 I have illustrated the position of the parts of the valve when the valve is in its open position. When the valve is open, the slot 34 will be disposed in register with the inlet opening 31 in the valve body 30 and the float 26 will be disposed in its lowermost position. Also the wedging pin 46 will be disposed out of engagement with the lower end of the shank on pin 52 and will be resting on the arcuate surface defining the depression 45 in the upper end of the rotary valve member 33.

Now it will be evident that as the liquid level rises in the tank or container 22, the float 26 will gradually be elevated. When the liquid in the container has reached a predetermined level, the float will have traveled to its uppermost position. The upward movement of the float results in the rotation of the valve member 33 in a clockwise direction (Figure 1). Obviously as this member 33 is turned the arcuate surface on its upper end defining depression 45 gradually raises pin 46 up into the transverse slot 47 in the body 30. This upward movement of the pin 46 will continue until it strikes the shank on the adjustable stud or pin 52. When this occurs the slot 34 will no longer be in register with the inlet passageway 31 in the valve body 30.

The upward pressure exerted on the float 26 will thereafter be translated into a wedging pressure between the upper end of the rotary member 33 and the pin 46. This wedging pressure will force the lower end of the rotary valve member into tight engagement with the lower portion of the wall defining the circular recess 32. In other words, the force of this wedging action will be applied to the portions of the ring member 33 diametrically opposite the pin 46. Obviously since the inlet passage way 31 in the valve body 30 is located diametrically opposite the pin 46, it necessarily follows that the rotary valve member 33 will be wedged into tight engagement with the portion of the valve body 30 adjacent the discharge orifice of the inlet passageway 31. The result of this wedging action will be to cause the valve member to so tightly engage the valve body at the inlet passageway 31 as to prevent any liquid from seeping into the container 22 past the lower edge of the rotary valve member 33.

It will also be evident that as the liquid is withdrawn from the container 22 through the outlet 60, the float 26 will move downwardly thus allowing the slot 34 in the rotary valve member 33 to be again brought into register with the inlet passageway 31, at which time liquid will be allowed to flow into the container.

Attention is also directed to the fact that by adjusting the position of pin 52 it is possible to vary the wedging action exerted upon the rotary valve member 33 as well as to vary the time in which this action will take place. For example, if the shank of the pin 52 is moved downwardly further into the transverse slot 47, this will mean that less movement on the part of the float 26 will be necessary in order to bring about the wedging action. Moreover, since the float 26 will then be in a position to tightly close the valve sooner than before, it necessarily follows that the valve will be closed when a slightly less liquid level is attained in the container 22. Conversely, by slightly raising the shank of pin 52 it is possible to slightly increase the level of the liquid which will be maintained in the container 22 by the valve.

Now by referring to Figure 2 it will be observed that I have provided the top 61 of the container 22 with a vent valve designated generally by the reference character 62. This vent valve includes a tubular plug 63 threaded into the top 61 and having threaded on its outer portion a cap 64. The inner end of the plug is provided with a head 65. Extending through the bore of the plug 63 is the upper end of a rod 66 which has threaded on its uppermost extremity a nut 67. Secured to the lower portion of the rod 66, or that portion which extends into the container 22, is a float 70. It will be noted that the upper end of the rod 66 is of a slightly less diameter than the lower end of the rod and that at the junction of this reduced end of the rod with the rest of the rod is a tapered shoulder 71.

It will be evident that as liquid flows into the container 22 it will displace air therefrom. This air will, as long as the float 70 is in the position shown in Figure 2, escape upwardly through the space between the reduced end of rod 66 and the wall defining the bore of the plug 63 into the atmosphere. However, as soon as the level of the liquid has risen to a given point the float 70 on rod 66 will rise causing shoulder 71 to engage the head 65 of the plug 63 at the bore of the plug. This will prevent any further air from either leaving or entering the container 22. That is to say, as long as the predetermined level of liquid is maintained in the container 22, the inside of the container is completely disconnected from the surrounding atmosphere.

Now, of course, it is to be understood that although I have illustrated and described in detail the preferred form of my invention, the invention is not to be thus limited, but only in so far as defined by the scope and spirit of the appended claims.

I claim as my invention:

1. In a valve, a valve body having a recess and an inlet passageway formed therein having its innermost end terminating at the recess, a rotary valve member positioned in the recess and having a slot opening to the exterior and adapted to be registered with said inlet passageway when the valve is in its open position, means for rotating said valve member to bring said slot out of register with said passageway, and means adapted when said slot is out of register with the passageway to wedge the valve member into tight engagement with the valve body at the discharge orifice of the passageway to prevent seepage of fluid past the valve member, said means comprising a float, a rod extending through a slot formed in said valve body and connected at one end to said valve member and mechanism including a toggle for connecting the rod to the float.

2. In a valve, a pair of substantially concentric members, one of said members being movable relative to the other member, means for moving said movable member, a fluid passageway in said other member, said movable member having a fluid passageway opening to the exterior and adapted to be aligned with the passageway in said other member, and means operable by the movement of said movable member to a position wherein its passageway is out of register with the passageway in the other member for wedging said members together, whereby a mechanical seal is formed between the members at the passageway in said other member, said means for moving the movable member comprising a float connected to the movable member by mechanism including a toggle.

3. In a valve, a valve body having a recess and a passageway in communication with said recess, a tube connected to said valve body and in communication with said passageway, a movable valve member in said recess, means for moving said movable member relative to said valve body including a float slidably mounted on said tube and connected to said movable member, said movable member having a fluid passageway opening to the exterior and arranged for alignment with said passageway in the valve body, and means operable by the movement of said movable member to a position wherein its passageway is out of register with the passageway in the valve body for wedging said members together so as to establish a mechanical seal between the members.

4. In a valve, a valve body having a recess and a passageway in communication with said recess, a tube connected to said valve body and in communication with said passageway, a movable valve member in said recess, means for moving said movable member relative to said valve body including a float slidably mounted on said tube and connected to said movable member by mechanism including a toggle and a rod extending through a slot in the valve body to the movable member, said movable member having a fluid passageway opening to the exterior and arranged for alignment with said passageway in the valve body, and means operable by the movement of said movable member to a position wherein its passageway is out of register with the passageway in the valve body for wedging said members together so as to establish a mechanical seal between the members.

5. In a valve, a valve body having an aperture, a tubular member arranged for communication with said aperture, a valve member for controlling the connection of said aperture with the exterior of said valve body, wedge means for holding said valve member in a given position and a float movable on said tubular member for operating said valve member and for bringing said wedge means into operation.

6. In a valve, a valve body having an aperture, a tubular member arranged for communication with said aperture, a valve member for controlling the connection of said aperture with the exterior of said valve body, a float movable on said tubular member for operating said valve member, and means for automatically wedging said valve member against said body when said valve member is in a given position.

In testimony whereof I have hereunto subscribed my name at San Francisco, San Francisco County, California.

CHARLES L. RAYFIELD.